Jan. 1, 1957  W. C. FERGUSON  2,775,917
SHEET METAL NUT WITH SEALING MEANS
Filed July 31, 1951

William C. Ferguson,
Inventor.
Koenig and Pope,
Attorneys.

United States Patent Office 2,775,917
Patented Jan. 1, 1957

2,775,917

SHEET METAL NUT WITH SEALING MEANS

William C. Ferguson, St. Louis, Mo., assignor, by mesne assignments, to American-Marietta Company, Chicago, Ill., a corporation of Illinois Application July 31, 1951, Serial No. 239,519

7 Claims. (Cl. 85—36)

This invention relates to female fastener elements, and more particularly, to self-sealing female fastener elements of the sheet metal type.

Among the several objects of the invention may be noted the provision of a fastener element that of itself is adapted to seal an opening through which a fastening is made and to render the fastening elements corrosion-resistant; the provision of a self-sealing fastener element wherein the sealing medium is relieved of stresses after the fastening is made; the provision of a self-sealing fastener element that is convenient to handle and readily applied; and, the provision of a self-sealing fastener element that is inexpensive to manufacture.

In general a fastener element of the female type having these objectives comprises a body formed with fastening means of some sort, for example, thread means, and with a surrounding face adapted for pressure application against an apertured member to which the element is fastened. On the pressure face of the body and self-adhered thereto is a layer of sealing material that is soft, tacky and extrudable. This particular sealing material is adapted to be extruded from beneath the pressure face of the body when the fastener element is pressure applied in making a fastening. In being extruded, the sealing material flows into the opening of the apertured member and forms a tacky corrosion-resistant seal, which is particularly useful in sealing against weather.

More specifically, a female fastener element of this invention may be of the sheet metal type comprising a plate with tongues struck upwardly from the center of the plate to form an opening for receiving a male fastener element, such as a screw. The male fastener engages the tongues of the female fastener to secure the pressure face of the female fastener against a member apertured to receive the male fastener. The sealing material may extend across the opening so that the male fastener receives a corrosion-resistant coating in passing through the female fastener of this invention. The sealing material is compressed between the pressure face of the plate and the opposed face of the apertured member so as to be extruded into adhering sealing engagement with the apertured member and the male fastener.

The plasticity of the sealing material is such that it will maintain its shape under normal conditions of handling, but under pressure will cold-flow with permanent deformation. In other words, the cold-flow characteristic of the sealing material must be sufficient to permit flow under pressures normally developed in making a fastening, but yet must not be so readily flowable as to interfere with the handling of the device. In this respect, a loosely woven fabric may be imbedded in the sealing material. The material is also tacky so as to improve sealing action and facilitate the manufacture of the fasteners. For convenient storage and handling before application, a nonadhesive facing may be provided on the outer surface of the sealing material. This nonadhesive facing may be of a nature that disintegrates during pressure application of the device. The material is also impervious to air and moisture. Under special conditions of use, the material may be non-staining, oil-resistant, or adapted to be vulcanized. Materials providing these desired characteristics in general are unvulcanized elastomers (rubber-like component). Suitable tackifiers, plasticizers and fillers (fibrous and granular) may be added to the unvulcanized elastomer to improve the physical characteristics of the material. For certain uses, it may be desirable further to include antioxidants, adhesives, vulcanizing agents, swelling agents and corrosion inhibitors.

Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which several of various possible embodiments of the invention are illustrated:

Similar reference characters indicate corresponding parts throughout the several views of the drawing.

Figure 1:
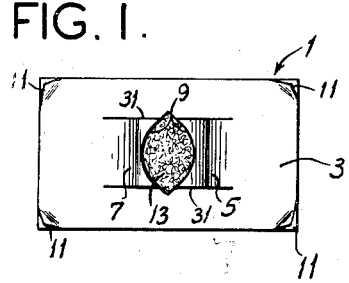
Fig. 1 is a top plan view of a female fastener element of this invention.

Referring now to the drawing, there is shown a female fastener element generally designated 1. This fastener is in part formed of a plate-like body 3 of rectangular outline having centrally located fastening means 5 and 7 adapted for fastening cooperation with a male member. As shown, the fastener element is of concavo-convex form, thereby having a concave face and a convex face, and is capable of being flattened from its concavo-convex form. The fastening means 5 and 7 are opposed tongues struck upwardly from the central portion of the plate with their free ends recessed to provide a male element receiving opening 9 and to cooperate as threads with a screw-type male fastener. The downwardly facing surface of the plate is adapted for pressure application against a member to which the element is fastened. Additionally, it will be observed that the plate is bowed upwardly and has corners 11 which are bent down a small amount. The body 3 as described above is in general commercially obtainable under the trade-mark Speed Nut and does not alone constitute the invention.

Figure 7:
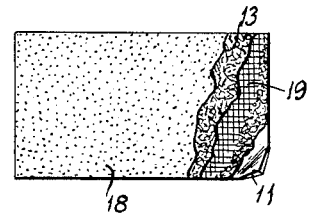
Fig. 7 is a bottom plan view similar to that of Fig. 3 illustrating a modification of the fastener element, parts being broken away; and, Fig. 8 is a perspective showing how a plurality of fastener elements may be made in conveniently usable form.

To the curved bottom side of the fastener plate 3 there is adhered a layer of sealing material 13 that is soft, tacky and extrudable. This sealing material, to be more particularly described is self-adhered to the plate 3 in sheet form to extend completely across the plate and cover the opening 9 therein. The exposed bottom face 17 of the sealing material is nonadhesive, but this nonadhesive facing is such that it disintegrates upon pressure extrusion of the sealing material. For example, this nonadhesive facing may be tissue paper as shown at 17 in Fig. 3 or a coating of talcum powder as shown at 18 in Fig. 7.

Figure 3:
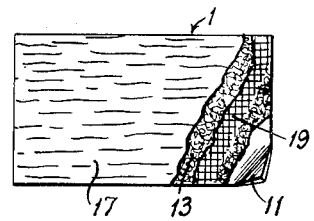
Fig. 3 is a bottom plan view of Fig. 1, parts being broken away.
Figure 2:
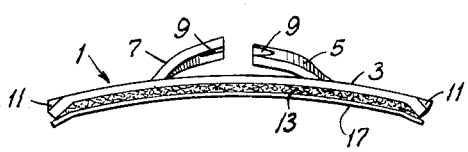
Fig. 2 is an enlarged side elevation of Fig. 1.
Figure 4:
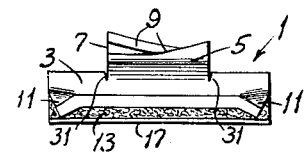
Fig. 4 is a right end view of Fig. 2.
Figure 8:
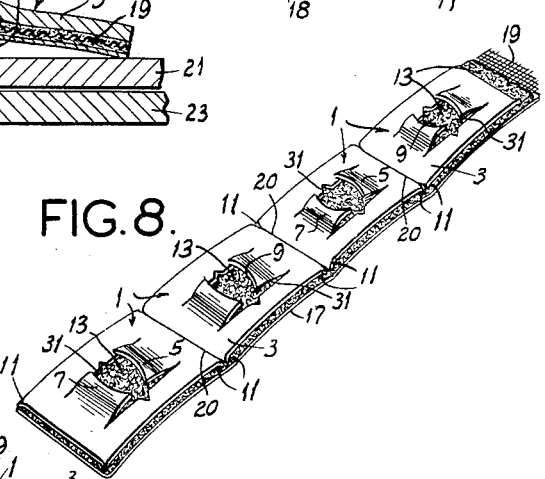

In manufacture, the sealing material is preformed as a substantially continuous web or strip and combined with fastener plates. As shown in Fig. 3, tobacco cloth 19 or other loosely woven material may be incorporated in the sealing material 13 during its manufacture to give it strength in its own plane. Fig. 8 illustrates a number of fastener elements joined together in strip form by partially sheared joints 20 and combined with a strip of the sealing material. The joined-together elements may initially be rolled up for convenient handling, and individual fastener elements subsequently detached as needed.

Figure 5:
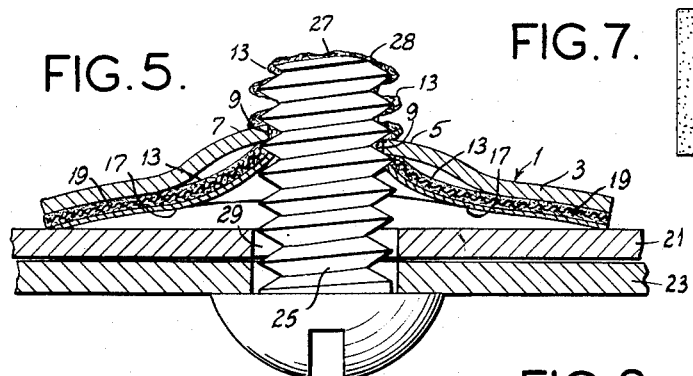
Fig. 5 is an enlarged longitudinal section illustrating a preliminary condition in making a fastening.
Figure 6:
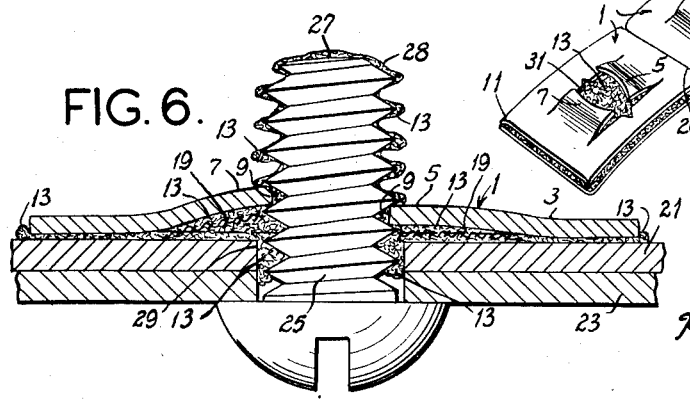
Fig. 6 is a view similar to that of Fig. 5 showing a final position of parts after the fastening has been made.

Referring now to Figs. 5 and 6, the female fastener element 1 of this invention is illustrated as being used to fasten together two apertured members 21 and 23. A male fastener screw 25 is loosely received through the member 21 and 23. The end 27 of the screw is pushed through the sealing material and threaded through the opening 9 between the tongues 5 and 7. It will be understood that the sealing material 13 is sufficiently pliable and the fabric 19 is sufficiently loose so that they do not offer excessive resistance to passage of the screw. As the screw is passed through the material 13, some of it adheres to the threads to form a coating 28, which remains on the threads as they are threaded between the tongues 5 and 7. In this manner, the male fastener element 25 and the edges of the tongues receive a corrosion-resistant coating, which is especially desirable in sealing against weather.

The male fastener element 25 is then tightened so that, as shown in Fig. 6, the tongues 5 and 7 are pulled down toward the apertured member 21. Also, the fastener plate 3 as a whole is straightened. Both movements cause sealing material to be extruded from between the fastener body 3 and the apertured member 21 and into the annular opening 29 around the screw in the apertured member 21. The movement of the sealing material into the opening 29 is aided by the auger effect of the screw threads. It further should be noted that the tongues 5 and 7 hinge downwardly relative to the plate and this movement is particularly adapted to drive sealing material into the opening 29. Some of the sealing material will be extruded through slots 31 defining the tongues 5 and 7, particularly when the tongues are in their elevated position of Fig. 5, but such extrusion of sealing material is resisted as the tongues hinge downwardly to close the slots 31. The curved or bowed configuration of the plate as a whole also is adapted for forcing sealing material primarily towards the screw 25.

In the event the amount of sealing material forced inwardly towards the screw is more than sufficient to fill the opening 29, the excess may escape beneath the periphery of the plate 3, which it will be understood is flexible. The plate is maintained slightly spaced from the member 21 by the upset corners 11, which while permitting extrusion also provides for a firm metal-to-metal fastening. Also, the bowed configuration of the plate and the upward biasing tendency of the tongues 5 and 7 resist flattening of the plate and thereby provide for a tight resilient fastening.

Considering now in more detail the nature of the sealing material, it is impervious to air, dust and moisture in order to be an effective sealing medium and is tacky so that it may be self-adherent to the body of the fastening element and also so that it will adhere to other members. Furthermore, the material is readily extrudable in order to fill voids which are to be sealed, the elasticity of the material being sufficiently low to permit cold flow under pressure but sufficiently high to resist undesired deformation, as during handling. A slight elasticity is not objectionable provided that it does not interfere with the primary extrusion properties. Finally, the material should not deteriorate over long periods.

Suitable components with which to make the sealing material are unvulcanized elastomers, including rubber. The physical and chemical characteristics of the elastomers may be improved by mixing other ingredients, such as plasticizers, tackifiers and fillers (fibrous and granular). These latter ingredients improve the extrusion properties of the material and give it strength and body so that it is convenient to handle and also provide for sealing.

The following examples illustrate sealing materials employed with the fastener element of this invention.

*Example 1*

| | Parts by weight |
|---|---|
| Elastometer—Polyisobutylene having an average molecular weight of 100,000 | 10 |
| Elastomer and tackifier—Polyisobutylene having an average molecular weight of 11,000 (obtainable under the trade name "Vistanex LMMS") | 30 |
| Plasticizer and extender—Blown asphalt having a melting point of 240° F., and a needle penetration of 2.5 mm. (obtainable under the trade name "No. 4 Korite") | 30 |
| Plasticizer and extender—Microcrystalline wax having a melting point of 165° F | 30 |

The proportions of the above mixture may be varied considerably and the elastomer may be any uncured rubber-like hydrocarbon.

*Example 2*

| | Parts by weight |
|---|---|
| Elastometer—Copolymer of butadiene and styrene containing 23.5% styrene (obtainable under the trade-name "GRS-25") | 8.4 |
| Tackifier and elastomer—Polyisobutylene having an average molecular weight of approximately 11,000 (obtainable under the trade-name "Vistanex LMMS") | 8.4 |
| Plasticizer and extender—Blown asphalt having a melting point of 240 and a needle penetration of 2.5 mm. (obtainable under the trade-name "#4 Korite") | 56.8 |
| Antioxidant—Trimethyl dihydroxy quinoline (obtainable under the trade-name "Agerite Resin D") | 0.3 |
| Filler—Carbon black of the semi-reinforcing furnace type (obtainable under the trade-name "Thermax") | 2.9 |
| Filler—Pulverized tree bark, 28 mesh (obtainable under the trade-name "508 Silvacon") | 11.6 |
| Filler—Pulverized tree bark, 100 mesh (obtainable under the trade-name "490 Silvacon") | 11.6 |

This material was tested for plasticity and consistency according to the standard ASTM (American Society for Testing Materials) D5-49 Test for bituminous materials and it gave a needle penetration of 3.5 mm. at 770 F. The test differed from the standard procedure only in that the material was packed into the test container instead of being poured in.

The proportions of the components in the above example may be varied considerably and the limits in percent by weight are as follows. Both the elastomer and the tackifier and elastomer may be varied between 5% to 40%. The plasticizer and extender may be varied between 0% to 60% and the antioxidant between 0% and 2%. The carbon black filler may be varied between 0% and 15% while the other two fillers may be varied between 0% to 30%. Also, any polyisobutylene having a molecular weight between 7000 to 15,000 is suitable.

*Example 3*

| | Parts by weight |
|---|---|
| Elastomer and tackifier—Polyisobutylene having an average molecular weight of approximately 11,000 (obtainable under the trade-name "Vistanex LMMS") | 49.0 |
| Filler—Chrysolite asbestos fibers | 18.0 |
| Filler—Chrysolite asbestos floats | 32.0 |
| Waterproofing agent—Aluminum distearate | 1.0 |

This material was tested by the ASTM D5–49 Test and a needle penetration of 3.5 to 6.0 mm. was obtained. In this example the plasticizer and extender were omitted. The waterproofing agent serves to close the pores of the fibrous filler. This material is non-staining and odorless and may be painted.

The proportions of the components in the above example can be varied considerably and the limits in percent by weight are as follows: The elastomer and tackifier component may be varied between 30% and 50%. The asbestos fiber filler may be varied between 10% and 50% while the asbestos float filler may be varied between 20% and 40%. The waterproofing agent may be present in percentages between 0.5% and 2%. Also, any metallic soap may be used in place of the aluminum distearate.

*Example 4*

| | Parts by weight |
|---|---|
| Elastomer—Reclaimed butadiene styrene copolymer (obtainable under the trade-name "Midwest S–201") | 57.7 |
| Plasticizer and extender—Mineral oil (obtainable under the trade-name "Indonex 632½") | 25.0 |
| Adhesive—Modified phenol formaldehyde resin (obtainable under the trade-name "Durex 12687") | 11.0 |
| Vulcanizing agent—Sulfur | 0.55 |
| Accelerator—Tetramethyl thiuram disulfide (obtainable under the trade-name "Methyl Tuads") | 0.05 |
| Accelerator—Mercaptobenzo thiazole (obtainable under the trade-name "Captax") | 0.05 |
| Accelerator activator and filler—Zinc oxide | 2.75 |
| Accelerator retarder—Benzoic acid | 0.15 |
| Antioxidant—Polymerized trimethyl dihydroxy quinoline (obtainable under the trade-name "Agerite Resin D") | 2.75 |

Needle penetration by the ASTM D5–49 Test was between 6.0 and 9.0 mm.

This material may be vulcanized by application of heat after the fastening has been made and the material extruded. The soft, tacky material is thereby changed to an expanding, tough, resilient substance. The adhesive greatly improves the bond between the metal parts being sealed after vulcanizing because it is a thermosetting resin. Prior to vulcanizing, the adhesive acts as a filler.

The proportions of the components in the above example may be varied considerably and the limits in percent by weight are as follows. The elastomer may be present in amounts between 20% and 60%, and the plasticizer and extender in amounts between 20% and 40%. The adhesive may vary in quantities between 10% and 20%. The vulcanizing agent may be present in amounts as low as .1% and as high as .10%. The disulfide and thiazole accelerators may each vary between .01% and 1.0%. Both the accelerator activator and filler and the antioxidant components may vary between 1% and 3%, while the accelerator retarder is present in proportions between .1% and .3%. Metallic oxides other than zinc oxide are useful as accelerator activators and fillers.

*Example 5*

Example 4 was repeated except that the percentage of the elastomer was reduced to 55.0% and a swelling agent, diazoamino benzene (obtainable under the trade-name "Unicel"), was added in the amount of 2.7% by weight. The ASTM D5–49 Test gave the same result as in Example 4. This material was also vulcanized after the seal was made to change the physical nature of the sealing material to a resilient condition. There was more expansion during the vulcanizing operation than with the material of Example 4.

The same variations in proportions of components is permissible in the above example as was listed in Example 4, the swelling agent of this example being present in amounts between 1% to 3%.

*Example 6*

| | Parts by weight |
|---|---|
| Elastomer—Polysulfide polymer (obtainable under the trade-name "Thiokol FA") | 57.0 |
| Plasticizer—2,2-benzothiazyl disulfide | 1.7 |
| Filler—Chrysolite asbestos fibers | 39.5 |
| Corrosion inhibitor—Zinc chromate | 1.8 |

The needle penetration in accordance with the ASTM D5–49 Test was between 5.0 and 10.0 mm. In this example it will be noted that the ingredients, particularly the elastomer, are oil-resistant. Also a chemical plasticizer is used.

The proportions of the components in the above example may be varied considerably and the limits in percentage by weight are as follows. The elastomer may be varied between 30% and 70%. The plasticizer may be present in amounts between 1% and 5%. The filler may compose between 25% and 50% of the material and the corrosion inhibitor may vary between 0% and 5%.

The unvulcanized elastomers have some degree of plasticity, which may be increased by the plasticizers or decreased by the solid fillers. In the first four examples, the plasticizer has a substantial filling effect. Also, the unvulcanized elastomers have a tacky property, and this is increased by the tackifiers or decreased by the extenders and fillers. An adhesive effect may also be obtained by the use of a thermo setting adhesive, as shown in Example 4. Antioxidants and corrosion inhibitors are desirable to prevent rusting of the metal parts with which the sealing material comes in contact and to preserve the elastomer. Where it is desirable, the sealing material of Examples 4 and 5 may be supplied in any suitable manner to the metal parts containing the sealing material. Inasmuch as the sealing material is substantially confined by the metal parts, expansion of the material resulting from the vulcanizing will tend to improve the seal.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A female fastener element comprising a metal member of concavo-convex form and thereby having a concave face and a convex face, said member being capable of being flattened from its concavo-convex form, said member having an opening completely therethrough for receiving a threaded male fastener element and provided with thread means for cooperation with the threaded male fastener element, and a layer of soft, tacky, coherent extrudable sealing material adhered to the concave face of said metal member, said layer, in its initial condition prior to use of the element to make a fastening, being of substantially uniform thickness and covering the entire surface of the concave face, and being continuous over the opening.

2. A female fastener element as set forth in claim 1 wherein a nonadhesive facing is provided on the outer surface of the layer of sealing material.

3. A female fastener element as set forth in claim 2 wherein said nonadhesive facing comprises a powder coating.

4. A female fastener element as set forth in claim 2 wherein said nonadhesive facing comprises a piece of thin paper.

5. A female fastener element as set forth in claim 2 wherein said sealing material is an unvulcanized elastomer.

6. A female fastener element as set forth in claim 5 wherein a loosely woven fabric is incorporated in the elastomer.

7. A series of female fastener elements each comprising a metal member of concavo-convex form and thereby having a concave face and a convex face, said members being connected by partially sheared joints, each member being capable of being flattened from its concavo-convex form, each member having an opening completely therethrough for receiving a threaded male fastener element and provided with thread means for cooperation with the threaded male fastener element, and a strip of soft, tacky, coherent extrudable sealing material adhered to the concave faces of the metal members in said series, said strip, in its initial condition, being of substantially uniform thickness and covering the entire surface area of the concave faces of said metal members, and being continuous over the openings in said metal members.

References Cited in the file of this patent

UNITED STATES PATENTS

| | | |
|---|---|---|
| 1,186,344 | Silvernail | June 6, 1916 |
| 1,263,219 | Fischer | Apr. 16, 1918 |
| 1,335,756 | Scarff | Apr. 6, 1920 |
| 1,515,996 | Buchanan | Nov. 18, 1924 |
| 1,872,014 | Schjolin | Aug. 16, 1932 |
| 2,047,298 | Tinnerman | July 14, 1936 |
| 2,236,929 | Tinnerman | Apr. 1, 1941 |
| 2,575,320 | Tinnerman et al. | Nov. 13, 1951 |
| 2,697,873 | Cooke | Dec. 28, 1954 |